(12) United States Patent
Jang et al.

(10) Patent No.: US 11,599,453 B2
(45) Date of Patent: Mar. 7, 2023

(54) VEHICLE FUNCTION TEST APPARATUS AND METHOD OF CONTROLLING THE SAME

(71) Applicants: HYUNDAI MOTOR COMPANY, Seoul (KR); KIA MOTORS CORPORATION, Seoul (KR); Ewha University—Industry Collaboration Foundation, Seoul (KR)

(72) Inventors: Hoon Jang, Seoul (KR); Hyeon A Chae, Seoul (KR); Byoung Ju Choi, Seoul (KR)

(73) Assignees: Hyundai Motor Company, Seoul (KR); Kia Motors Corporation, Seoul (KR); Ewha University—Industry Collaboration Foundation, Seoul (KR)

( * ) Notice: Subject to any disclaimer, the term of this patent is extended or adjusted under 35 U.S.C. 154(b) by 386 days.

(21) Appl. No.: 16/908,307

(22) Filed: Jun. 22, 2020

(65) Prior Publication Data

US 2021/0001870 A1 Jan. 7, 2021

(30) Foreign Application Priority Data

Jul. 5, 2019 (KR) .................. 10-2019-0081419

(51) Int. Cl.
*G06F 11/00* (2006.01)
*G06F 11/36* (2006.01)
(Continued)

(52) U.S. Cl.
CPC ...... *G06F 11/3684* (2013.01); *G06F 11/0739* (2013.01); *G06F 11/3013* (2013.01); *G06F 11/3692* (2013.01)

(58) Field of Classification Search
CPC ............ G06F 11/3684; G06F 11/3692; G06F 11/0739; G06F 11/3013; G06F 11/3688;
(Continued)

(56) References Cited

U.S. PATENT DOCUMENTS 8,752,027 B2 * 6/2014 Noureddine ........ G06F 11/3688
717/130
8,954,807 B2 2/2015 Ma et al.
(Continued)

FOREIGN PATENT DOCUMENTS

KR 101291817 B1 7/2013

*Primary Examiner* — Joseph D Manoskey
(74) *Attorney, Agent, or Firm* — Slater Matsil, LLP

(57) ABSTRACT

A test apparatus for generating a test case based on a fault injection technique and a method of controlling the same are disclosed. The method includes identifying at least one function in a program to be tested based on a software detailed design, generating a test design document based on fault location that can be generated in connection with the identified at least one function and a fault type to be injected into the fault location, searching for the fault location to be injected based on the generated test design document and source code of the program, determining a fault injection scheme and the fault type, and predicting a result by applying a fault injection corresponding to the fault injection scheme and the fault type into the searched location to generate a test case.

20 Claims, 6 Drawing Sheets

(51) Int. Cl.
*G06F 11/07* (2006.01)
*G06F 11/30* (2006.01)

(58) Field of Classification Search
CPC . G06F 11/263; G06F 11/366; B60W 50/0205; B60W 2050/021
See application file for complete search history.

(56) References Cited

U.S. PATENT DOCUMENTS

| | | | | |
|---|---|---|---|---|
| 10,108,536 B2* | 10/2018 | Li | ............... | G06F 11/3684 |
| 2010/0287535 A1* | 11/2010 | Kim | ............... | G06F 11/3688 |
| | | | | 717/127 |
| 2013/0159964 A1* | 6/2013 | Szpak | ............... | G06F 11/3688 |
| | | | | 717/124 |
| 2014/0351797 A1* | 11/2014 | Kalayci | ............... | G06F 11/3624 |
| | | | | 717/127 |
| 2019/0050308 A1* | 2/2019 | Chaudhari | ............... | G06F 11/2284 |
| 2019/0205233 A1* | 7/2019 | Jung | ............... | G06F 11/263 |

* cited by examiner

FIG. 5

| SWC | Runnable | ID | Injecting Location | Injecting Details (Fault Type) | Normal Condition | Detection | Handing | |
|---|---|---|---|---|---|---|---|---|
| SWC.c | FuncA() | TS_001_1 | G | g_var1 | Invalid Value | range 0 to 10 | TSR_001 | TSR_002 |
| | FuncB() | TS_001_2 | R | return 5; | Invalid Value | no greater than 10 | TSR_003 | TSR_004 |
| | FuncA() | TS_001_3 | P | var2 | Invalid Value | no greater than 10 | TSR_003 | TSR_004 |

FIG. 6

| SWC | Runnable | ID | Injected Fault | | | Expected Results | |
| --- | --- | --- | --- | --- | --- | --- | --- |
| | | | Line | Type | Code | | |
| SWC.c | FuncA() | TS_001_1_1 | 001_2 | G | g_var =-1; | pop up warning message. | 610 |
| | | TS_001_1_2 | 001_2 | G | g_var = 11; | pop up warning message. | 620 |
| | FuncB() | TS_001_2_1 | 002_1 | M | return 11; | Set var2 to 0. | |
| | FuncA() | TS_001_3_1 | 002_1 | M | FuncC(11) | Set var2 to 0. | |

//  # VEHICLE FUNCTION TEST APPARATUS AND METHOD OF CONTROLLING THE SAME

CROSS-REFERENCE TO RELATED APPLICATION

The present application claims priority to and the benefit of Korean Patent Application No. 10-2019-0081419, filed on Jul. 5, 2019, which is incorporated herein by reference in its entirety.

TECHNICAL FIELD

The present disclosure relates to an apparatus for testing vehicle functional safety and a method of controlling the same, and more particularly to a test apparatus capable of generating a test case based on a fault injection technique and a method of controlling the same.

BACKGROUND

The statements in this section merely provide background information related to the present disclosure and may not constitute prior art.

ISO 26262, which is a vehicle functional safety standard, recommends a fault injection test (FIT) as a method of determining whether a safety mechanism is properly operated at the time of unit and integrated tests of software. However, there is limitation in securing reliability of the fault injection test for verifying the functional safety of software only through standardization of requirements on functional safety of software for vehicles.

A method capable of generating a test case by applying a software design document and a safety requirements document derived in a design step at the time of performing a fault injection test of software for vehicles may be desired.

SUMMARY

Accordingly, the present disclosure is directed to a vehicle function test apparatus and a method of controlling the same that substantially obviate one or more problems due to limitations and disadvantages of the related art.

The present disclosure provides a test apparatus for vehicles providing more convenient functions and a method of controlling the same.

The present disclosure provides a test apparatus capable of generating a test case based on a fault injection technique and a method of controlling the same.

A method of controlling a test apparatus may include identifying at least one function to be tested in a program to be tested based on a software detailed design, generating a test design document based on locations of faults that can be generated in connection with a function of the at least one identified function to be tested and fault types to be injected into the fault locations, searching for a fault location to be injected among the extracted fault locations based on the generated test design document and source code of the program to be tested, determining a fault injection scheme and a fault type, and predicting an expected result based on fault injection corresponding to the fault injection scheme and the fault type into the searched location to generate a test case.

In another aspect of the present disclosure, a test apparatus for software may include a test range determination unit configured to extract a test range based on a function related to a safety mechanism and a call relationship from a program to be tested, a test design document generation unit configured to generate a test design document including the location of a fault to be injected, the type of the fault, or a normal condition to be violated according to the test range and at least one requirements document, and a test case generation unit configured to generate a test case based on source code of the program to be tested and the test design document.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a view showing an example of the form of a test design document in one form of the present disclosure; and FIG. 6 is a view showing an example of the form of a test case in one form of the present disclosure.

Figure 1:
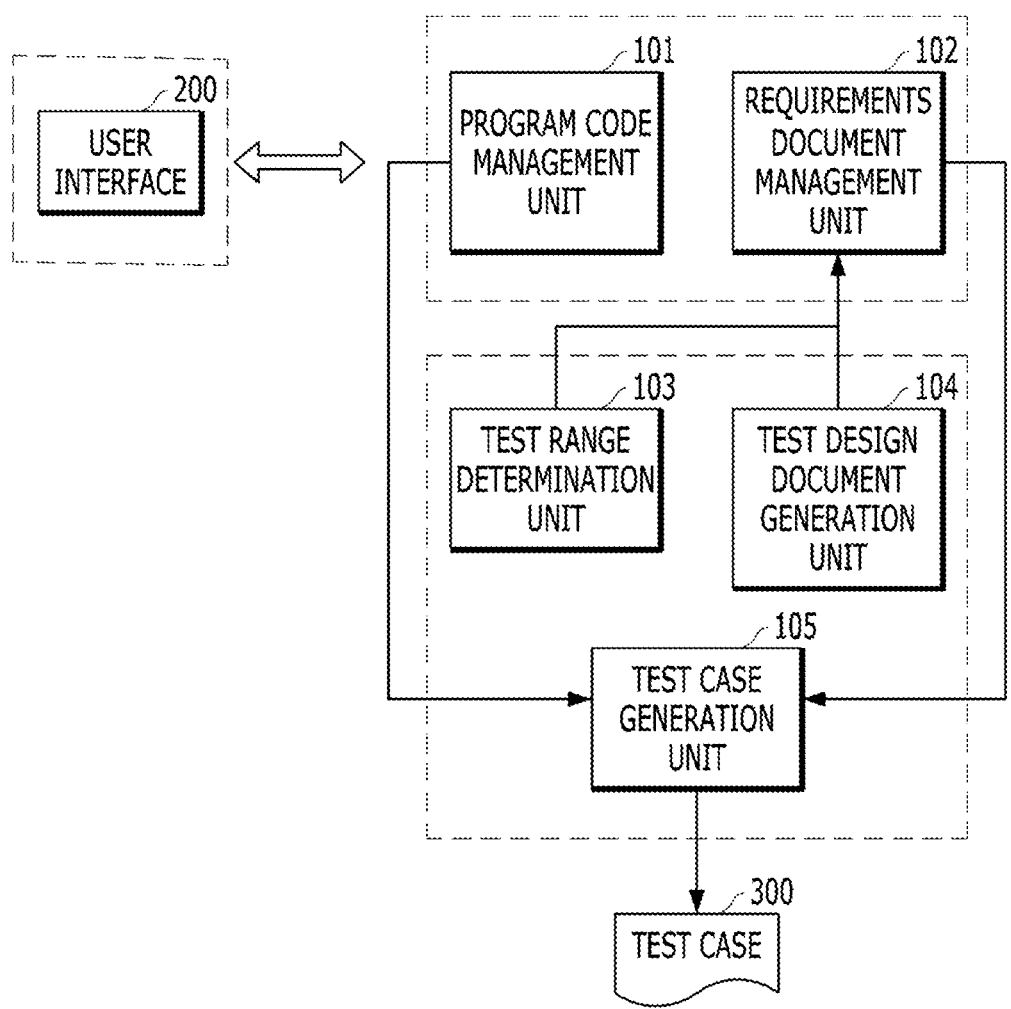
FIG. 1 is a block diagram showing an example of the construction of a test apparatus in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The term "comprises" or "includes" used herein should be interpreted not to exclude other elements but to further include such other elements, unless mentioned otherwise. In addition, the same reference numerals denote the same constituent elements throughout the specification.

In some forms of the present disclosure, a test apparatus capable of automatically generating a necessary test case through input of a requirements/design document and program code at the time of performing a fault injection test for verifying safety of software installed in a component constituting a vehicle and a method of controlling the same are proposed.

In particular, in some forms of the present disclosure, a test apparatus capable of automatically generating a meaningful test case through text processing from a requirements/design document and program code at the time of performing a fault injection test for automotive open system architecture (AUTOSAR) based software and a method of controlling the same are proposed. Preferably, the requirements/design document is written in natural language.

First, the construction of a test apparatus in some forms of the present disclosure will be described with reference to FIG. 1.

FIG. 1 is a block diagram showing an example of the construction of a test apparatus in some forms of the present disclosure.

Referring to FIG. 1, the test apparatus in some forms of the present disclosure includes a program code management unit 101 for storing/managing code of a program to be tested, a requirements document management unit 102 for storing/managing requirements documents about the program to be tested, a test range determination unit 103 for extracting a test range based on a function related to a safety mechanism and a call relationship from the program to be tested, a test design document generation unit 104 for generating a test design document including the location and type of a fault to be test injected and normal conditions to be violated according to the test range and the requirements documents, and a test case generation unit 105 for generating a test case 300 based on the program code and the test design document.

Here, the test apparatus may receive or output test-related information through a user interface 200. For example, the user interface 200 may acquire various kinds of information for generating the test case from an input device, such as a keyboard or a mouse, and may display/output the test design document, the result of generating the test case, other contents stored in a server through a display means or a printing means.

Hereinafter, the respective components of the test apparatus in some forms of the present disclosure will be described in more detail.

First, the program code management unit 101 stores code of a test program such that a detailed fault injecting location is included at the time of generating a fault injection test case based on code. Here, the code of the test program may mean source code. In this case, source code of software installed in an actual vehicle component (e.g. a controller) is to be verified, not simply a model based on system requirements, whereby usability and effectiveness of a test may be guaranteed.

Figure 2:
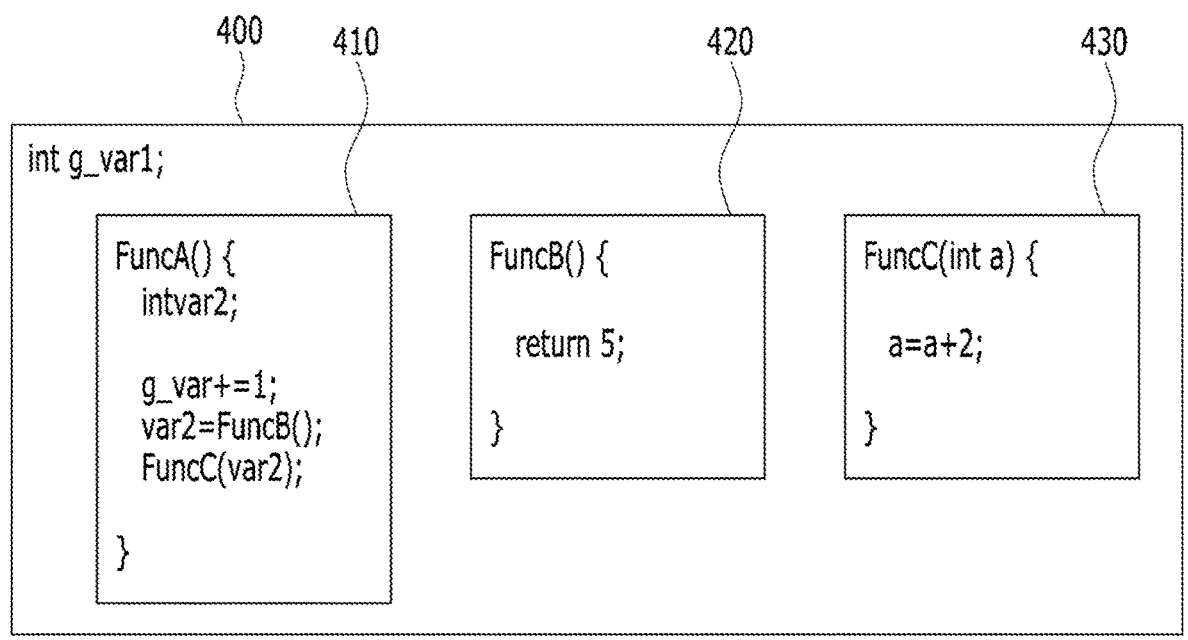
FIG. 2 is a view showing an example of the form of a program input through a user interface in one form of the present disclosure.

The detailed code management form of the program code management unit 101 will be described with reference to FIG. 2 and Table 1. FIG. 2 is a view showing an example of the form of a program input through a user interface in some forms of the present disclosure.

Referring to FIG. 2, a program 400 including three functions 410, 420, and 430 may be input to the test apparatus through the user interface 200. As a result, the program code management unit 101 may manage/store the program 400 input in the form shown in Table 1 below.

TABLE 1

| Line  | Code           |
|-------|----------------|
| 001_1 | int var2;      |
| 001_2 | g_var += 1;    |
| 001_3 | var2 = FuncB( );|
| 001_4 | FuncC(var2);   |
| 002_1 | return 5;      |
| 003_1 | a = a + 2;     |

In Table 1 above, line items are stored in the form of "function ID_number of lines in function," and the function ID means function ID in a software detailed design. In conclusion, it can be seen from Table 1 that each function is managed while having an individual ID in the software detailed design.

Referring back to FIG. 1, the requirements document management unit 102 may manage/store all documents in an intermediate step for generating the test case 300 as well as documents acquired from a user in order to generate the test case, and may store information necessary for traceability between documents.

The test range determination unit 103 may determine a range to be tested of the entire program using the software detailed design stored in the requirements document management unit 102. The test range may be determined depending on relation to the safety mechanism, i.e. depending on whether the program corresponds to a function in which technical safety requirements (TSRs) are reflected and to a function having a call relationship with the function. Here, the technical safety requirements may be defined in the ISO 26262 standard.

The test design document generation unit 104 may search for safety description (SD) using a software detailed design about functions included in the test range. The test design document generation unit 104 adds a fault injecting location to a test design document from FIT-related information corresponding to SD. At this time, in the case in which an error type related to SD is not generated at the injecting location, the same is excluded. When the injecting location is determined, the test design document generation unit 104 may add the type of a fault to be injected (injecting details) to the test design document from the SD based on a fault type system table (FIT faults). The detailed form of the fault type system table is shown in Table 2 below.

TABLE 2

| Test step | Fault generating location | | | Fault type | | Id |
|---|---|---|---|---|---|---|
| Unit test | Runnable | Variable | Global variable | Data Error | Invalid Value | 1 |
| SW-SW | Runnable- | Caller | Parameter | Data Error | Invalid Value | 2 |
| integrated | Runnable | | Call syntax | Program Flow Error | Uncalled Function | 3 |
| test | | | | | Bypass Function Call | 4 |
| | | | | | Illegal Instruction | 5 |
| | | Callee | Global variable | Data Error | Invalid Value | 6 |
| | | | | Access Error | Invalid Address | 7 |
| | | | Return statement | Data Error | Invalid Value | 8 |
| | | | | Program Flow Error | Illegal Instruction | 9 |
| | | | | Timing Error | Data Loss | 10 |
| | | | | | CPU Clock Corruption | 11 |
| | SWC- | Caller | Parameter | Data Error | Invalid Value | 12 |
| | RTE | | | Timing Error | Data Delay | 13 |
| | | | | | Data Loss | 14 |

TABLE 2-continued

| Test step | Fault generating location | | | Fault type | | Id |
|---|---|---|---|---|---|---|
| | | | Call syntax | Program Flow Error | Uncalled Function | 15 |
| | | | | | Bypass Function Call | 16 |
| | | | | | Illegal Instruction | 17 |
| | | | | Timing Error | CPU Clock Corruption | 18 |
| | | Callee | Global variable | Data Error | Invalid Value | 19 |
| | | | | Access Error | Invalid Address | 20 |
| | | | Return statement | Data Error | Invalid Value | 21 |
| | | | | Program Flow Error | Illegal Instruction | 22 |
| | | | | Timing Error | Data Loss | 23 |
| | | | | | No Response | 24 |
| | | | | | CPU Clock Corruption | 25 |
| | | | | Asymmetric Error | Asymmetric Value | 26 |
| SWC-BSW | Caller | | Parameter | Data Error | Invalid Value | 27 |
| | | | | Timing Error | Data Delay | 28 |
| | | | Call syntax | Program Flow Error | Uncalled Function | 29 |
| | | | | | Bypass Function Call | 30 |
| | | | | | Illegal Instruction | 31 |
| | | | | Timing Error | CPU Clock Corruption | 32 |
| | | Callee | Global variable | Data Error | Invalid Value | 33 |
| | | | | Access Error | Invalid Address | 34 |
| | | | Return statement | Data Error | Invalid Value | 35 |
| | | | | Program Flow Error | Illegal Instruction | 36 |
| | | | | Timing Error | Data Loss | 37 |
| | | | | | No Response | 38 |
| | | | | | CPU Clock Corruption | 39 |
| | | | | Asymmetric Error | Asymmetric Value | 40 |
| SWC-ECU HW | Caller | | Parameter | Data Error | Invalid Value | 41 |
| | | | | Timing Error | Data Delay | 42 |
| | | | Call syntax | Program Flow Error | Uncalled Function | 43 |
| | | | | | Bypass Function Call | 44 |
| | | | | | Illegal Instruction | 45 |
| | | | | Timing Error | CPU Clock Corruption | 46 |
| | | Callee | Global variable | Data Error | Invalid Value | 47 |
| | | | | Access Error | Invalid Address | 48 |
| | | | Return statement | Data Error | Invalid Value | 49 |
| | | | | Program Flow Error | Illegal Instruction | 50 |
| | | | | Timing Error | Data Loss | 51 |
| | | | | | No Response | 52 |
| | | | | | CPU Clock Corruption | 53 |
| | | | | Asymmetric Error | Asymmetric Value | 54 |

Referring to Table 2, the fault type system table (FIT faults) is defined by classifying fault types having IDs individually assigned there to into a plurality of categories. For example, the largest category is a test step, and sub fault types are defined according to the fault generating location and fault type category by test unit. Of course, the fault type system table is illustrative, and it is not necessary to be the same as what is shown in Table 2.

When the fault type to be injected (injecting details) is added, the test design document generation unit 104 may confirm a mechanism for performing search/solution at the time of fault generation from the technical safety requirements (TSRs) to finally generate a test design document. At this time, the test design document generation unit 104 may derive a mechanism for performing search/solution at the time of fault generation from TSRs written using natural language, an SDD, a description of which will follow, etc. through text processing.

Next, the test case generation unit 105 may generate a test case 300 based on the test design document generated by the test design document generation unit 104 and the program code stored in the program code management unit 101. The test case may include ID, injected fault (line, type, and code) and expected results. Here, the injected fault line may be extracted by searching for the injecting location of the test design document in the program code, and one of generation (G) and mutation (M) may be selected as the injected fault type. The injected fault code may be generated so as to violate a normal condition item of the test design document, and the expected results may be generated through a handling item of the test design document.

As shown in Table 2, the test may be mainly divided into a unit test and an integrated test. The unit test may mean a test for a single function, and the integrated test may mean a test for two or more functions that are related to each other (e.g. that have a call relationship therebetween). Hereinafter, unit test and integrated test processes will be described with reference to FIGS. 3 and 4 based on the construction of the test apparatus described above with reference to FIG. 1.

Figure 3:
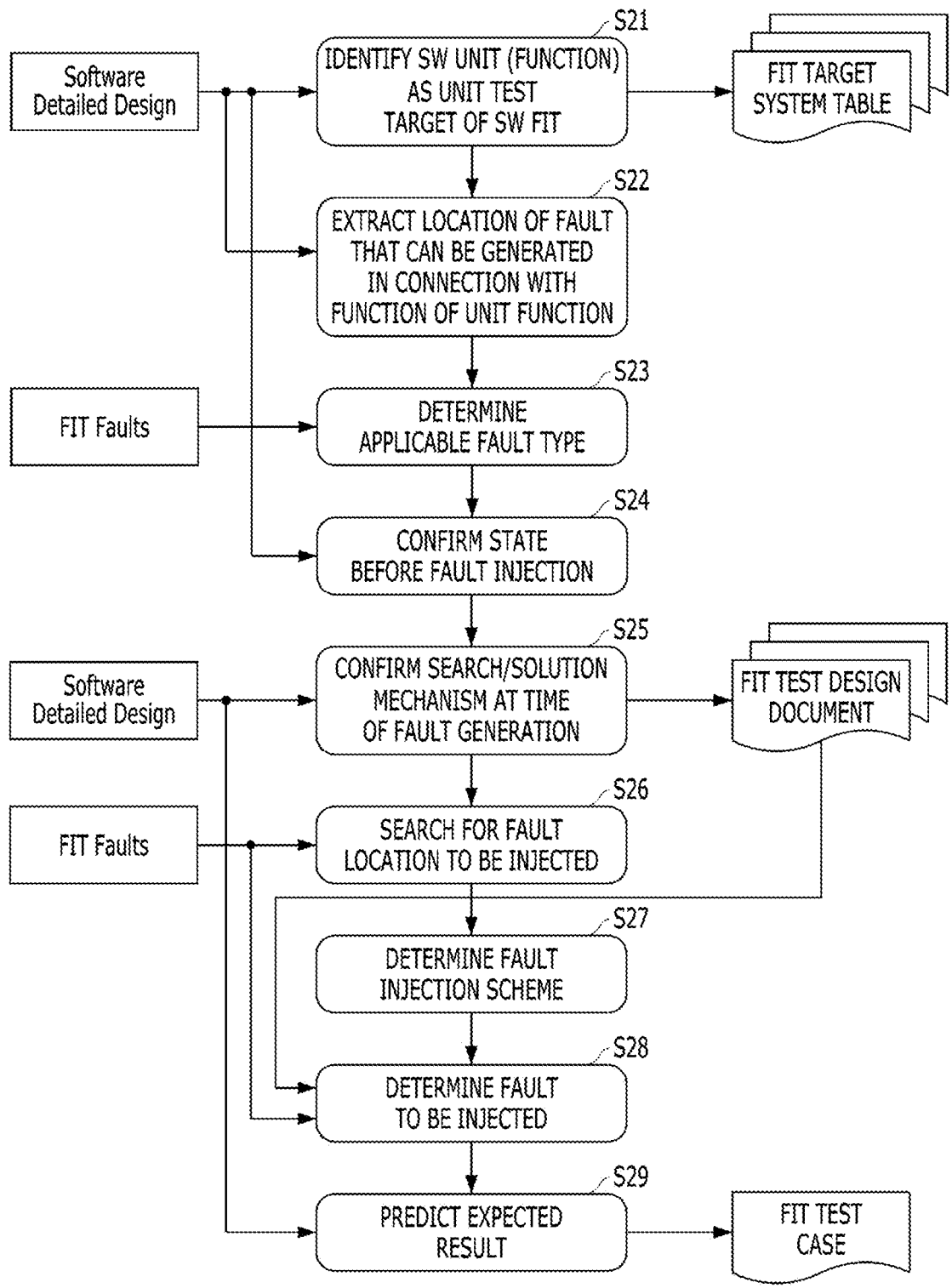
FIG. 3 is a flowchart showing an example of a unit test process performed by the test apparatus in one form of the present disclosure.

FIG. 3 is a flowchart showing an example of the unit test process performed by the test apparatus in some forms of the present disclosure.

Before describing the sequence of the flowchart shown in FIG. 3, input and output values will be described first.

A software detailed design means a software detailed design (SDD) complemented to more easily perform a test target identification process for fault injecting test and a subsequent test case generation process. An example of the software detailed design is shown in Table 3 below.

TABLE 3

| SWC | Runnable | | Description | Map SWR | TSR | FIT related information | | | |
|---|---|---|---|---|---|---|---|---|---|
| | | | | | | Global variable | Return statement | Callee | Parameter |
| SWC.c | UD_001 | FuncA( ) | SWUD_001.01 | The FuncA shall define g_var1 with range 0 to 10 | | TSR 001 TSR_002 | g_var1 | | |
| | | | SWUD_001.02 | The value of var2 shall be no greater than 10. | | TSR_003 TSR_004 | | FuncB( ) | |
| | | | | | | TSR_003 TSR_004 | | FuncC( ) | Var2 |
| | UD_002 | FuncB( ) | SWUD_002.01 | Return 5 | SWR_001 | | return 5; | | |
| | UD_003 | FuncC( ) | SWUD_003.01 | Add 2 from the given parameter | SWR_002 | | | | |

Referring to Table 3, the SDD may include the construction of a map about functions constituting software, related technical safety requirements (TSRs) information, and global variable, return statement, call function, and parameter information related to a fault injection test.

The SDD is preferably written based on the following precautions.

The software detailed design must include a description about a safety mechanism designed therein (safety description; SD) as well as functional action of software, and must be written in natural language, and the writing form of the SD is classified based on the AUTOSAR error type as shown in Table 4 below.

TABLE 4

| AUTOSAR Error Type | SD Form |
|---|---|
| Data Error | Data Value Requirement |
| Program Flow Error | Program Flow Requirement |
| Access Error | Access Address Requirement |
| Timing Error | Timing Constraint Requirement |
| Asymmetric Error | Asymmetric Requirement |

The details of Table 4 may be defined as follows.
1) Data Value Requirement
The SWC shall define VAR1 with range C1 to C2.
The value of VAR1 shall be no greater (less) than C1.
2) Program Flow Requirement
The correct reading of VAR1 through BSW/RTE shall be ensured.
The correct transformation of VAR1 to CAN/SPI shall be ensured.
3) Access Address Requirement
The reading/writing of VAR1 shall be done through BSW/RTE.
4) Timing Requirement
The SWC shall set VAR1 on command, if a fault on VAR1 is detected for more than C1.
5) Asymmetric Requirement
The correct routing of the output VAR1 shall be ensured.

In the above definition, SWC indicates a software component, VAR# indicates a variable, C# indicates a constant, CAN/SPI indicates a CAN/SPI interface-related function, and BSW/RTE indicates a BSW/RTE layer function.

In addition, the fault type system table (FIT faults) is the same as what has been described previously with reference to Table 2.

Next, the technical safety requirements may mean technical safety requirements (TSRs) defined in the ISO 26262 standard. An example of the TSRs is shown in Table 5 below.

[Table 5]

TABLE 5

| Technical Safety Requirements | |
|---|---|
| TSR_001 | Check the value of g_var1. |
| TSR_002 | If g_var < 0 or g_var > 10, then pop up warning message. |
| TSR_003 | Check the value of var2 |
| TSR_004 | If var2 > 10, then set var2 to 0. |

Furthermore, the program code may mean program code automatically generated by a model-based development support tool, such as MATLAB or Simulink, or directly written by a developer Referring to FIG. 3, in the unit test step, first, the test range determination unit 103 may identify a software unit (i.e. a function) as a unit test target of a software fault injection test (SW FIT) (S21). The test target is preferably a function in which a safety mechanism is reflected, among functions in a software component (.c file). The identified test target may be stored/managed in the requirements document management unit 102 in the form of an FIT target system table.

Subsequently, the test design document generation unit 104 may extract the location of a fault that can be generated in connection with the function of a unit function (S22). Here, the fault that can be generated may mean a fault that causes software to deviate from a safe state. Specifically, the test design document generation unit 104 may identify a safety mechanism in the function and a global variable related thereto through the software detailed design for the function identified as the test target, and may extract a fault that can be generated due to pollution of the value of the global variable (potential causes of failure).

In addition, upon confirming that a safety mechanism capable of searching for and solving the fault that can be generated, extracted in the previous step (S22), is present in the system, the test design document generation unit 104 may determine an applicable fault type among types defined in the fault type system table (FIT faults) (e.g. 54 FIT fault types in Table 1) (S23).

Subsequently, the test design document generation unit 104 may confirm the state before fault injection (S24). Here, the state before fault injection means the state of a function or a variable before fault injection, i.e. a normal condition, and the test case may be designed so as to deviate from the state. The state before fault injection may be confirmed through the software detailed design (SDD), and a detailed method may be configured in a form that confirms a normal condition table as shown in Table 6 below.

TABLE 6

| SD Form | SD Detail | Normal Condition |
|---|---|---|
| Data Value Requirement | The SWC shall define VAR1 with range C1 to C2. | range C1 to C2. |
| | The value of VAR1 shall be no greater(less) than C1. | no greater(less) than C1. |
| Program Flow Requirement | The correct reading of VAR1 through BSW/RTE shall be ensured. | correct reading of VAR1 |
| | The correct transformation of VAR1 to CAN/SPI shall be ensured. | correct transformation to CAN/SPI |
| Access Address Requirement | The reading/writing of VAR1 shall be done through BSW/RTE. | reading/writing through BSW/RTE |
| Timing Requirement | The SWC shall set VAR1 on command, if a fault on VAR1 is detected for more than C1. | transformation of VAR1 in C1. |
| Asymmetric Requirement | The correct routing of the output VAR1 shall be ensured. | correct routing of VAR1 |

Referring to Table 61, the normal condition is defined by SD detail based on the SD form.

Next, the test design document generation unit 104 confirms whether there is a safety mechanism capable of performing search/solution when a fault is actually generated with reference to the technical safety requirements specification written in a system level design step (S25).

Through the above processes (S22 to S25), the test design document generation unit 104 may generate a test design document.

When the test design document is generated, the test case generation unit 105 may search for the fault location extracted at the time of generating the test design document in the program code (S26).

When a fault location to be injected is searched for, the test case generation unit 105 may determine a fault injection scheme between mutation (M) and generation (G), which are compile type fault injection schemes (S27).

Next, the test case generation unit 105 may determine the details of a fault to be injected into actual code (S28). Here, the injected fault is preferably designed so as to deviate from the normal condition before fault injection confirmed at the time of generating the test design document.

Subsequently, the test case generation unit 105 may predict the result of the system/software after fault injection (S29). At this time, fault injection is performed in software in which a safety mechanism is realized, whereby the expected result may be the operation of an error processing mechanism.

Through the above processes, the test case generation unit 105 may generate an FIT test case.

Next, the integrated test process will be described with reference to FIG. 4.

Figure 4:
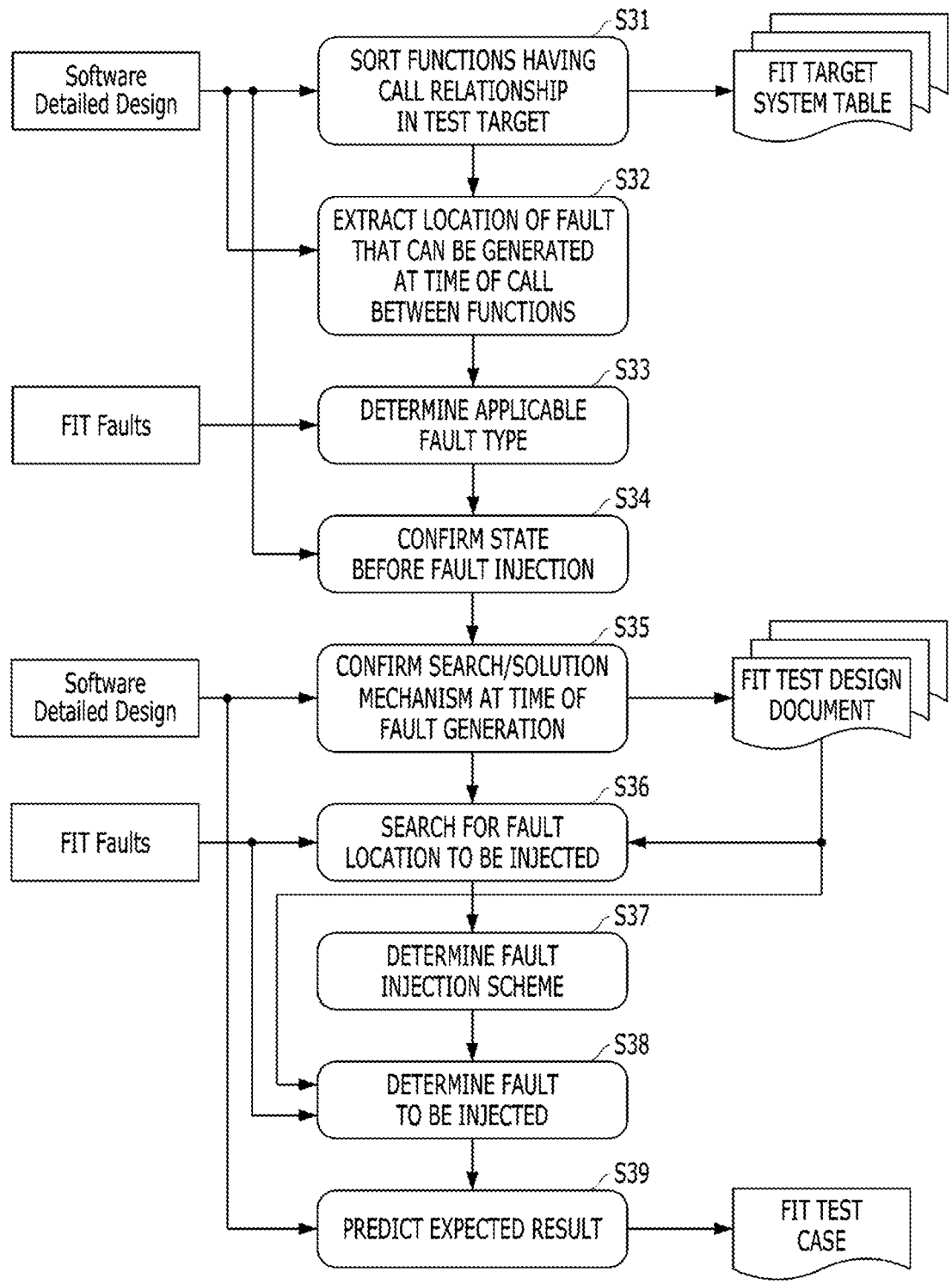
FIG. 4 is a flowchart showing an example of an integrated test process performed by the test apparatus in one form of the present disclosure.

FIG. 4 is a flowchart showing an example of the integrated test process performed by the test apparatus in some forms of the present disclosure.

Since the process shown in FIG. 4 is similar to the unit test process shown in FIG. 3, only differences will be described for clarity of the specification.

In the integrated test process, a design document for each AUTOSAR layer is used as an input value of the test range determination unit 103 and the test design document generation unit 104, instead of the SDD applied to the unit test. Consequently, the function identification process (S21) may be replaced with a process of sorting functions having a call relationship in a test target (S31), and the process of extracting the location of the fault that can be generated in connection with the function of the unit function (S22) may be replaced with a process of extracting the location of a fault that can be generated at the time of call between functions (S32).

Subsequent processes (S33 to S39) correspond to the above processes (S23 to S29), and therefore a duplicate description will be omitted.

Hereinafter, the operation of the test apparatus will be described again with reference to the program illustrated in FIG. 2.

First, a tester receives the technical safety requirements (TSRs) and the software detailed design (SDD) through the user interface 200, and stores the same in the requirements document management unit 102. The TSRs may have the form shown in Table 5, and the SDD have the form shown in Table 3.

Similarly, source code of the illustrated program may be stored in the program code management unit 101 through the user interface 200, and the storage form thereof may be converted into the form of Table 1, as previously described.

In the unit test, the test range determination unit 103 may determine only FuncA( ) 410 in which a safety mechanism is realized (i.e. TSRs are reflected), among FuncA( ) 410, FuncB( ) 420, and FuncC( ) 430, as a test target.

In the integrated test, the test range determination unit 103 may determine a call relationship with FuncA( ) in which a safety mechanism is realized (e.g. a function call between FuncA( ) and FuncB( ) or a function call between FuncA( ) and FuncC( ) as a test target.

In the unit test, the test design document generation unit 104 may determine global variable "g_var1" of the function FuncA( ) as a candidate of an injecting location. Since the contents described in the SDD correspond to "data value requirements" of the SD form and the data error can be generated at the global variable according to Table 2, the test design document generation unit 104 may select "g_var1" as a fault injecting location.

In the integrated test, the test design document generation unit 104 may determine function call syntax FuncB( ) and a return statement "return5;" of FuncB( ) as candidates of an injecting location in the function call between FuncA( ) and FuncB( ) and determine function call syntax FuncC( ) and a parameter "var2" as candidates of an injecting location in the function call between FuncA( ) and FuncC( ). Since the contents described in the SDD correspond to "data value requirements" but the data error can be generated only at the global variable, the parameter, and the return statement according to Table 2, FuncB( ) and FuncC( ) are excluded from the fault injecting location.

The form of the test design document generated by the test design document generation unit 104 through the above processes is shown in FIG. 5.

FIG. 5 is a view showing an example of the form of a test design document in some forms of the present disclosure.

Referring to FIG. 5, the ID, injecting location, fault type, normal condition, detection, and handling value of a single function may be defined in the test design document for a unit test 510, and the ID, injecting location, fault type, normal condition, detection, and handling value of each of two functions corresponding to a fault injecting location, among functions having a call relationship therebetween, may be defined in the test design document for an integrated test 520.

Next, the operation of the test case generation unit 105 based on the test design document generated as shown in FIG. 5 will be described with reference to FIG. 6.

FIG. 6 is a view showing an example of the form of a test case in some forms of the present disclosure.

Referring to FIG. 6, for a unit test 610, the test case generation unit 105 may determine, as injected fault code, code by which the location "001_2" of "g_var" becomes an injected fault line in connection to "TS_001_1" of the test design document 510 and the value of g_var becomes −1 and 11, which are boundary values, in order to violate "normal condition (range 0 to 10)" of the test design document. Expected results may become a handling item TSR_002 of the test design document.

For an integrated test 620, the test case generation unit 105 may determine, as injected fault code, code by which the location "002_1" of the return statement "return5;" becomes an injected fault line in connection to "TS_001_2" of the test design document 520 and the return value becomes 11, which is a boundary value, in order to violate "normal condition (no greater than 10)" of the test design document 520. Expected results may become a handling item TSR_004 of the test design document. The test case generation process from the "TS_001_3" of the test design document 520 is also similar to "TS_001_2," and therefore a duplicate description will be omitted.

In some forms of the present disclosure, at least of the program code management unit 101 or the requirements document management unit 102 of the test apparatus may be replaced with a separate device, or may be separately realized as a program recording device (a memory, etc.) or an electronic control unit (ECU).

In addition, the test case generation unit 105 may automatically perform and determine a fault injection test of a program target, such as an ECU, may output the result of the fault injection test, and may smooth code modification through recommendation of fail and safe logic when a program error is generated due to lack of fail and safe logic at the time of fault injection, in addition to output of an automatically generated test case.

Furthermore, in FIG. 3 or 4, a fault pattern that was mainly generated in vehicle software for mass-produced vehicles in the past may be input instead of the SDD, and the test design document generation unit 104 may be configured not only to confirm the presence of a search/solution mechanism at the time of fault generation but also to recommend an appropriate search/solution mechanism in the case in which the search/solution mechanism is omitted.

The forms of the present disclosure described above have the following effects.

The forms of the present disclosure relate to a method and apparatus for generating a test case of AUTOSAR-based software, wherein a test case for confirming the operation of a safety mechanism in the software may be automatically generated for source code through text processing from requirements documents (TSRs, SD, and the like) written in natural language, whereby convenience is improved.

In addition, in some forms of the present disclosure, it is possible to secure reliability of the test process at the time of performing the unit and integrated tests of the AUTOSAR-based software using the fault injection technique and to reduce a development period.

Furthermore, the types of faults that can be generated in the AUTOSAR-based software may be defined as AUTOSAR standards, the form of software safety requirements may be prescribed, whereby it is possible to objectify preparation of requirements in which subjectivity intervenes and to automatically generate a test case through text processing.

The present disclosure described above may be implemented as a computer-readable program stored in a computer-readable recording medium. The computer-readable medium may be any type of recording device in which data is stored in a computer-readable manner. The computer-readable medium may include, for example, a hard disk drive (HDD), a solid-state disk (SSD), a silicon disk drive (SDD), a read-only memory (ROM), a random access memory (RAM), a compact disc read-only memory (CD-ROM), a magnetic tape, a floppy disk, and an optical data storage device.

As is apparent from the above description, the test apparatus in some forms of the present disclosure constructed as described above is capable of more conveniently and reliably verifying safety of vehicle software.

In particular, in some forms of the present disclosure, a test case for confirming the operation of a safety mechanism for source code is automatically generated, whereby it is possible to secure reliability of the test process at the time of performing a test based on a fault injection technique and to reduce a development period.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of controlling a test apparatus, the method comprising:
    identifying at least one function in a program to be tested based on a software detailed design;
    generating a test design document based on fault location that can be generated in connection with the identified at least one function and based on a fault type to be injected into the fault location, wherein generating the test design document comprises confirming a normal condition before the fault injection based on the software detailed design and confirming a search and solution mechanism based on technical safety requirements when a fault occurs;
    searching for the fault location to be injected based on the generated test design document and source code of the program;
    determining a fault injection scheme and the fault type; and
    predicting a result by applying a fault injection corresponding to the fault injection scheme and the fault type into the searched fault location to generate a test case.

2. The method according to claim 1, wherein identifying the at least one function comprises identifying a unit function for a unit test.

3. The method according to claim 2, wherein generating the test design document comprises extracting the fault location that can be generated in connection with the identified unit function.

4. The method according to claim 1, wherein identifying the at least one function comprises sorting functions having a call relationship for an integrated test.

5. The method according to claim 4, wherein generating the test design document comprises extracting the fault location that can be generated at a time of call among the sorted functions.

6. The method according to claim 1, wherein the test case comprises at least one of an identifier (ID), a line corresponding to the fault injection, the fault type, a fault code, or the predicted result.

7. The method according to claim 6, wherein the method comprises generating the fault code to violate the normal condition.

8. The method according to claim 1, wherein identifying the at least one function comprises identifying a function reflecting a safety mechanism and a function having a call relationship with the function reflecting the safety mechanism.

9. A non-transitory computer readable recording medium containing a program for performing a method of controlling a test apparatus comprising:
identifying at least one function in a program to be tested based on a software detailed design;
generating a test design document based on fault location that can be generated in connection with the identified at least one function and based on a fault type to be injected into the fault location, wherein generating the test design document comprises confirming a normal condition before the fault injection based on the software detailed design and confirming a search and solution mechanism based on technical safety requirements when a fault occurs;
searching for the fault location to be injected based on the generated test design document and source code of the program;
determining a fault injection scheme and the fault type; and
predicting a result by applying a fault injection corresponding to the fault injection scheme and the fault type into the searched fault location to generate a test case.

10. The computer readable recording medium according to claim 9, wherein the method comprises identifying the at least one function by identifying a unit function for a unit test.

11. The computer readable recording medium according to claim 10, wherein the method comprises generating the test design document by extracting the fault location that can be generated in connection with the identified unit function.

12. The computer readable recording medium according to claim 9, wherein the method comprises identifying the at least one function by sorting functions having a call relationship for an integrated test.

13. The computer readable recording medium according to claim 12, wherein the method comprises generating the test design document by extracting the fault location that can be generated at a time of call among the sorted functions.

14. A test apparatus for software, the test apparatus comprising:
a processor; and
a non-transitory memory for storing instructions executable by the processor;
wherein the processor is configured to:
extract a test range based on a function related to a safety mechanism and a call relationship from a program to be tested;
generate a test design document including at least one of a fault location to be injected, a fault type, or a normal condition to be violated based on the test range and at least one requirements document;
generate a test case based on source code of the program to be tested and the test design document;
search for a safety mechanism in the test range based on a software detailed design; and
determine the fault location to be injected based on a fault type system table.

15. The test apparatus according to claim 14, wherein the processor is further configured to manage the source code based on a function identifier in a software detailed design and a line of a function corresponding to the function identifier.

16. The test apparatus according to claim 14, wherein the processor is further configured to:
identify a unit function as the test range for a unit test;
sort functions having a call relationship; and
identify the sorted functions as the test range for an integrated test.

17. The test apparatus according to claim 16, wherein the processor is further configured to:
extract the fault location that can be generated in connection with a function of the identified unit function for the unit test; and
extract the fault location that can be generated at a time of call among the sorted functions for the integrated test.

18. The test apparatus according to claim 14, wherein the processor is further configured to:
exclude the fault location at which an error type related to the safety mechanism is not generated, from the fault location to be injected.

19. The test apparatus according to claim 14, wherein the processor is further configured to:
confirm a search and solution mechanism when a fault occurs through text processing from the at least one requirements document written in natural language.

20. The test apparatus according to claim 14, wherein the test case comprises at least one of an identifier (ID), a fault injection line, the fault type, fault code corresponding to the normal condition to be violated, or an expected result.

* * * * *